(12) United States Patent
Wiens (10) Patent No.: US 6,425,277 B2
(45) Date of Patent: Jul. 30, 2002

(54) SHEET METAL HEMMING METHOD AND APPARATUS

(75) Inventor: Philip V. Wiens, Ontario (CA)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/845,920

(22) Filed: Apr. 30, 2001

Related U.S. Application Data (63) Continuation-in-part of application No. 09/475,748, filed on Dec. 30, 1999, now Pat. No. 6,257,043.

(51) Int. Cl.[7] .............................. B21D 5/16; B21D 39/02
(52) U.S. Cl. ......................... 72/210; 72/220; 29/243.58
(58) Field of Search ........................... 72/322, 323, 118, 72/125, 210, 211, 214, 223, 48, 220; 29/243.58

(56) References Cited

U.S. PATENT DOCUMENTS

| 2,091,474 A | * | 8/1937 | Elliott ............................ 72/48 |
| 5,267,387 A | * | 12/1993 | Sawa ........................... 29/509 |

FOREIGN PATENT DOCUMENTS

| JP | 61-262432 | * | 11/1986 |
| JP | 02-6022 | * | 1/1990 |
| JP | 04-253524 | * | 9/1992 |
| JP | 05-253626 | * | 10/1993 |
| JP | 06-344037 | * | 12/1994 |
| JP | 07-290158 | * | 11/1995 |
| JP | 07-60370 | * | 3/1996 |
| JP | 07-68324 | * | 3/1996 |

* cited by examiner

*Primary Examiner*—Daniel C. Crane
(74) *Attorney, Agent, or Firm*—Reising, Ethington, Barnes, Kisselle, Learman & McCulloch, P.C.

(57) ABSTRACT

A sheet metal hemming method and apparatus for securing inner and outer sheet metal panels together by forming a generally flat hem along respective peripheries of the two panels. A fixture receives and holds an outer sheet metal panel that is formed to include an upstanding border flange. An inner sheet metal panel is stacked on top of the outer panel. A hemming tool movably supported adjacent the fixture bends the upstanding border flange of the outer sheet metal panel over a periphery of the inner panel and into a position forming an acute angle relative to an underlying portion of the outer panel. The hemming tool also bends an outer portion of the border flange down onto the periphery of the inner panel and into a position over and generally parallel to the underlying portion of the outer sheet metal panel.

25 Claims, 4 Drawing Sheets

(PRIOR ART)

SHEET METAL HEMMING METHOD AND APPARATUS

This is a continuation in part of U.S. Ser. No. 09/475,748 filed on Dec. 30, 1999, now U.S. Pat. No. 6,257,043.

TECHNICAL FIELD

This invention relates generally to the hemming of sheet metal and more particularly, to a hemming apparatus and method for forming a generally flat hem.

BACKGROUND OF THE INVENTION

It is well known to construct motor vehicle body panels, doors, hoods, fenders, tailgates, trunks and deck lids by stamping an outer sheet metal panel and separately stamping an inner sheet metal reinforcing panel and then joining the two panels together by hemming a flange of the periphery of the outer panel over an adjacent edge of the inner panel to secure the panels together. Desirably, the outer panel is slightly larger than the inner panel to provide a border flange portion along the periphery of the outer panel that can be folded over the peripheral edge of the inner panel to define the hem flange that connects the two panels.

When the flange is folded over the peripheral edge of the inner panel with a traditional hemming apparatus and method, the resulting edge of the hemmed panels has a generally smooth, curved or arcuate shape with a diameter of the bend equal to twice the thickness of the outer panel plus the thickness of the inner panel. With inner and outer panels of the same thickness, the diameter of the bend for a standard hemming apparatus and method is equal to three times the thickness of a sheet metal panel. While many standard hemming methods and devices produce a smooth and fair hem or fold line, the relatively large bend diameter of the fold line reflects light in various directions along the curved fold line. This creates the visual impression that the gap between adjacent hemmed panels of the vehicle body is larger than it actually is, that the gap is inconsistent or that the panels are not flush with one another.

According to known hemming processes, an outer sheet metal panel is stamped and formed to include a border flange along a periphery of the outer panel. An inner sheet metal reinforcing panel is formed and shaped to be slightly smaller than the outer sheet metal panel. The inner panel is placed against the outer panel such that a periphery of the inner panel is disposed adjacent and generally parallel to the border flange of the outer panel. The two panels are then secured together by hemming the border flange of the outer panel over the adjacent periphery of the inner panel. In more conventional hemming processes this is done by folding the border flange over the inner panel such that the flange lies flat against the inner panel—resulting in a relatively large flange bend diameter. In a less-conventional process known as an "open hem" process, the panels are secured together by folding the border flange over the inner panel such that the flange is inclined against the outer edge of the inner panel and an outer edge of the flange is spaced from the inner panel. This leaves a smaller flange bend diameter but also leaves an elongated gap between and along the outer edge of the flange and the inner panel that foreign material can collect in.

SUMMARY OF THE INVENTION

The invention is a sheet metal hemming apparatus for securing two sheet metal panels together by forming a generally flat hem along respective peripheries of the two panels. The apparatus includes a fixture configured to receive and hold a sheet metal panel having an upstanding border flange and a hemming tool movably supported adjacent the fixture and configured to bend the upstanding border flange of a sheet metal panel supported on the fixture into a position forming an acute angle relative to an underlying portion of the panel. The hemming tool is configured to bend an outer portion of the flange into a position over and generally parallel to the underlying portion of the sheet metal panel.

The invention also includes a method for forming a generally flat hem along respective peripheries of the two panels. According to this method one can secure two sheet metal panels together by forming a generally flat hem along respective peripheries of the two panels. An outer sheet metal panel is formed to include a generally upstanding border flange along a periphery of the outer panel. The border flange is then folded until the flange is inclined over an underlying portion of the outer panel. The border flange is then further folded such that an outer portion of the flange is disposed generally parallel to an underlying portion of the outer panel.

Objects, features and advantages of this invention include providing a relatively simple hemming apparatus that produces a hemmed flange having a first portion inclined relative to a second portion, that provides a hemmed flange with a reduced bend diameter, that provides a fold line having a more consistent appearance when viewed from different angles, that provides adjacent hemmed panels on a vehicle visually appearing to have a narrower or smaller gap between them, that eliminates the need for a separate assembly operation to provide sealing material between the hemmed flange and inner panel by providing a closed hem, that is readily adaptable for use with panels having different configurations, that is reliable, durable, of relatively simple design and economical manufacture and assembly and that has a long, useful service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION

Figure 1:
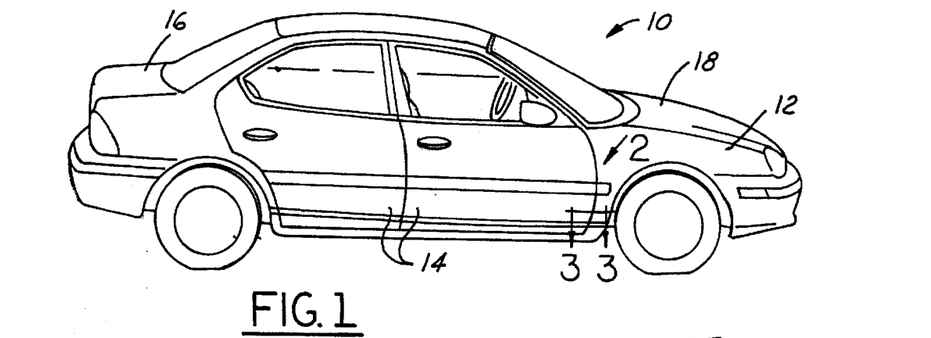
FIG. 1 is a perspective view of an automobile having various body panels formed from hemmed inner and outer sheet metal panels.
Figure 2:
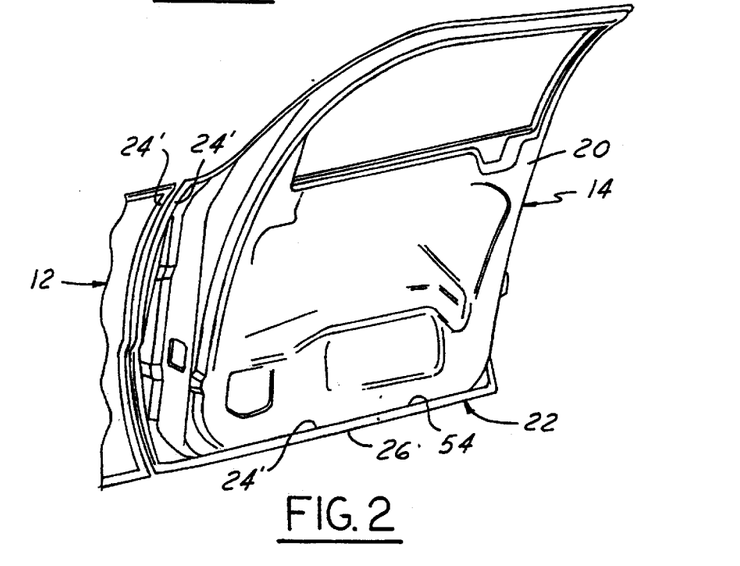
FIG. 2 is a perspective view of the interior of a vehicle door having hemmed inner and outer sheet metal panels.
Figure 3:
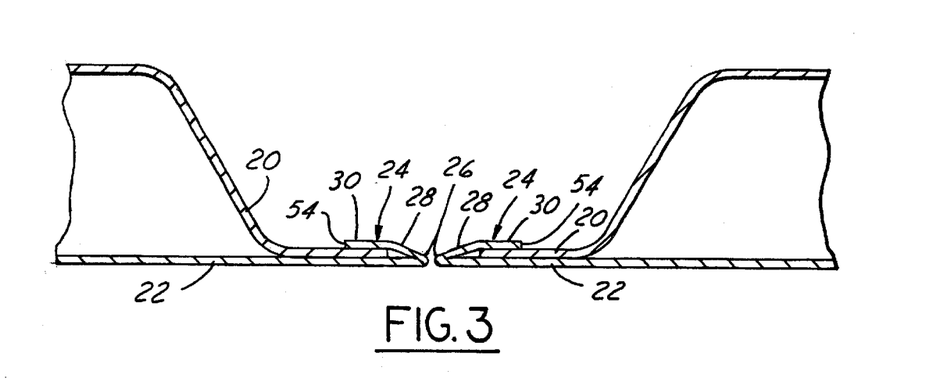
FIG. 3 is a cross-sectional view taken generally along line 3—3 of FIG. 1.
Figure 4:
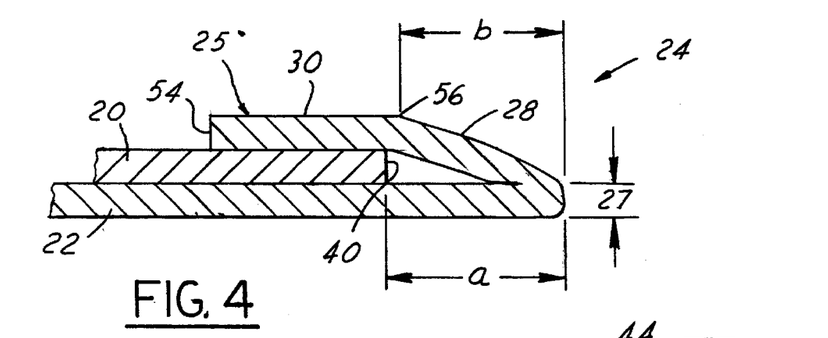
FIG. 4 is an enlarged fragmentary sectional view of the encircled portion 4 in FIG. 3.

Referring in more detail to the drawings, FIGS. 1 and 2 illustrate a vehicle 10 having various body panels 12, doors 14, a trunk 16 and a hood 18 wherein each may be formed from inner and outer sheet metal panels 20, 22 connected together by a hem 24 embodying the invention. As best shown in FIGS. 3 and 4, the various body panels 12, 14, 16, 18 of the vehicle 10 may each comprise an outer sheet metal panel 22 that is slightly larger than an inner sheet metal panel 20 and has a border flange 25 along the periphery of the outer panel 22 that is folded or hemmed over the peripheral edge 40 of the inner panel 20 to form the hem 24 connecting inner and outer panels 20, 22 together. A smooth and fair hem outer edge 26 is required to avoid blemishes on the finished, painted panel and to ensure a consistent gap between adjacent panels 20, 22.

Figure 5:
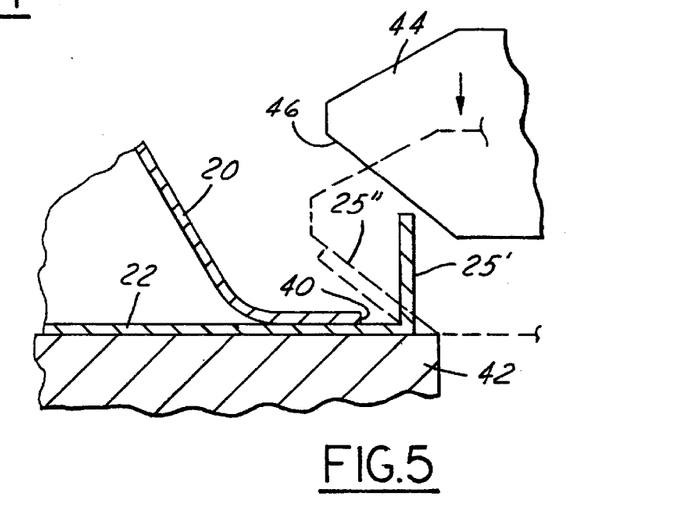
FIG. 5 is a fragmentary sectional view illustrating a prehem tool for initially bending the flange of the outer sheet metal panel.
Figure 6:
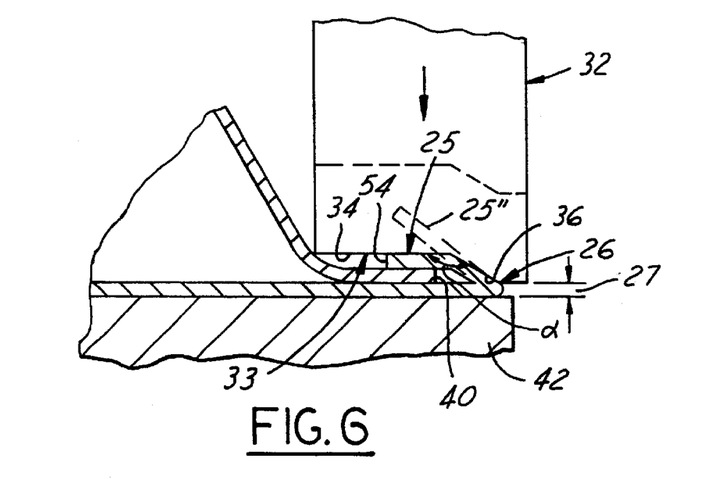
FIG. 6 is a fragmentary sectional view illustrating a final hem tool constructed according to a first embodiment of the invention.
Figure 9:
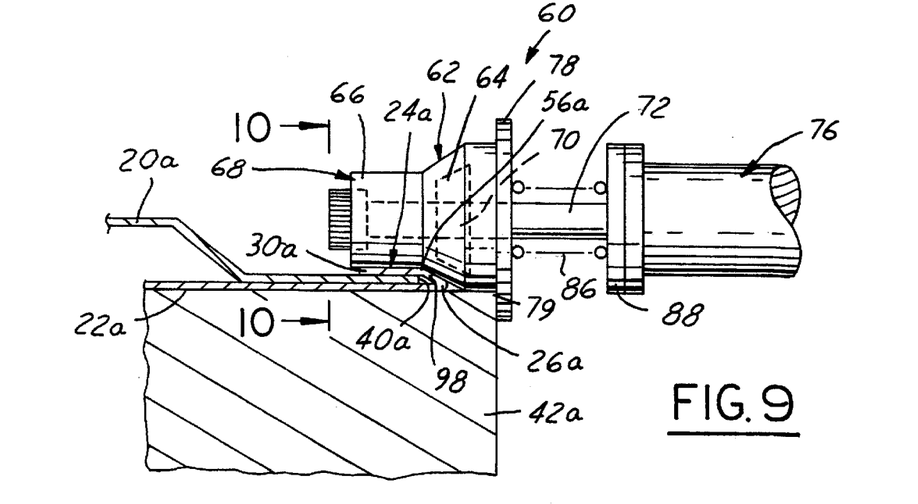
FIG. 9 is a cross-sectional view of a second hem tool embodiment of the invention.
Figure 10:
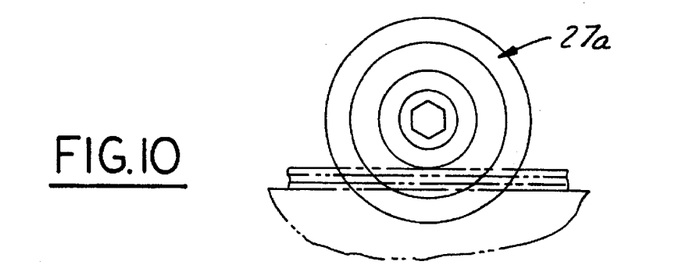
FIG. 10 is an end view of a roller of the hem tool of FIG. 9.
Figure 11:
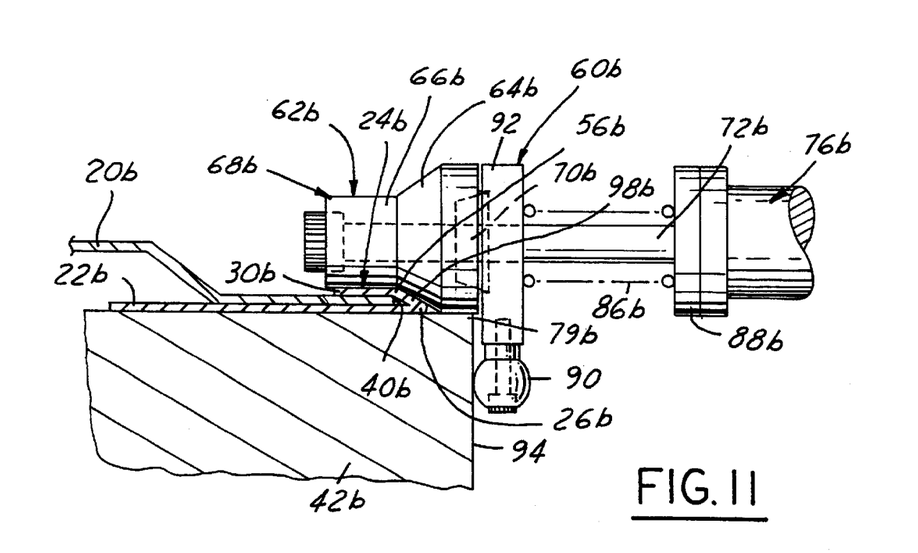
FIG. 11 is a cross-sectional view of a third hem tool embodiment of the invention.

FIGS. 5 and 6 illustrate a method and a first apparatus embodiment of the invention for forming a flat hem 24 in the outer sheet metal panel 22 onto the inner sheet metal panel 20 to connect the panels 20, 22 together. A second hemming method and second and third flange hemming apparatus embodiments for producing flat modified hems are shown in FIGS. 9–11. Reference numerals with the subscript "a" in FIGS. 9 and 10 indicate alternative configurations of elements that also appear in the first embodiment. Likewise, reference numerals with the subscript "b" in FIG. 11 indicate alternative configurations of elements that also appear in the first or second embodiments. Unless indicated otherwise, where a portion of the following description of the first embodiment uses a reference numeral to refer to the figures, that portion of the description applies equally to elements designated by the subscripts "a" and "b" in FIGS. 9–11. Likewise, unless indicated otherwise, where a portion of the description of the second apparatus embodiment uses a reference numeral to refer to the figures, that portion of the description applies equally to elements designated by the subscript "b" in FIG. 11.

The hemming method and apparatus provide a smooth and fair fold line defining the outer edge 26 of the outer panel 22 having a reduced outside bend diameter 27 that is less than three times the thickness of a sheet metal panel 20 or 22, desirably less than about twice the thickness of a sheet metal panel 20 or 22, and preferably generally equal to or less than the thickness of a single sheet metal panel 20 or 22, to improve the appearance of the outer edge 26 and of the automotive vehicle body in general. To achieve the reduced outside bend radius or diameter 27, the hemming apparatus and method produce a hemmed flange 24 that has an inner portion 28 adjacent the outer edge 26 that is generally flat and inclined relative to an outer portion 30 folded flat against the inner sheet metal panel 20.

The improved hem 24 may be produced with a standard hemming press using an improved hemming tool 32 (FIG. 6) with an end forming face 33 having a first, generally planar section 34 constructed to form the outer portion 30 of the flange and a second portion 36 inclined relative to the first section 34 to form the inner portion 28 of the flange 24. As best shown in FIGS. 5 and 6, to form the hem, the inner sheet metal panel is disposed on the outer sheet metal panel 22 that in turn is received on a locating and support fixture 42 in a press. A prehem tool 44 having an inclined forming face 46 is preferably carried by an upper platen of a press (not shown) and is advanced toward and engages the upstanding flange 25' of the outer sheet metal panel 22 to bend it from an initial included angle of approximately 90 degrees to a prehemmed acute included angle of between 25 and 75 degrees, and preferably about 45 degrees, to form a prehemmed flange 25". Thereafter, as shown in FIG. 6, the final hem tool 32 also carried by an upper platen of the press, is advanced toward the prehemmed flange 25" to bend the flange into its final, hemmed position and form the flange 25 having an outside bend diameter 27 that is less than three times the thickness of a sheet metal panel 20 or 22.

The final hem tool 32 has a forming face 33 with a generally planar first section 34 constructed to form the outer portion 30 of the flange 25 substantially flat onto the inner sheet metal panel 20 and thus provide a so called "closed hem" without any gap between an outside edge 54 of the flange 25 and the inner panel 20. The second section 36 of the forming face 33 is inclined at an obtuse included angle relative to the first section 34 and is also preferably generally planar to form the generally flat, inclined inner portion 28 of the hemmed flange 25 immediately adjacent to the outer edge 26 or bend in the outer sheet metal panel 22. Desirably, the second section 36 is disposed at an included angle of about 100 to 160 degrees relative to the first section 34 and preferably about 135 degrees. The angle may be varied to permit the location of the peripheral edge 40 of the inner sheet metal panel 20 to be varied relative to the outer edge 26 or hem line. Preferably, the second section 36 of the final hem tool 32 does not immediately overlie and is spaced outboard of the inner sheet metal panel 20 to prevent the inner sheet metal panel 20 from being unduly pinched by the inclined second section 36 of the hemming tool 32 and inner portion 28 of the flange 25. Thus, as shown in FIG. 4, the longitudinal distance "a" from the peripheral edge 40 of the inner panel 20 to the outer edge 26 of the outer panel 22 is preferably greater than the longitudinal distance "b" from the fold or bend 56 between the inner portion 28 of the flange 25 and the outer portion 30 and the outer edge 26 of the outer panel 22.

Figure 7:
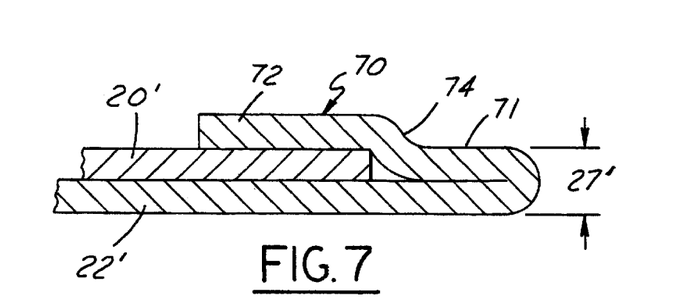
FIG. 7 is an enlarged fragmentary sectional view illustrating an alternative modified hemmed flange configuration.

A modified hem flange embodiment is illustrated at 70 in FIG. 7. The modified hemmed flange 70 has an outer bend diameter 27' equal to about twice the thickness of the outer sheet metal panel 22'. An inner portion 71 of the flange 70 is folded flat onto the outer sheet metal panel 22' and an outer portion 72 of the flange 70 is folded flat or closed on the inner sheet metal panel 20'. To prevent creasing of the flange 70 and to provide the outer portion 72 above the inner sheet metal panel 20', a smooth or generally arcuate transition or ramp section 74 is preferably provided between the inner and outer portions 71, 72 of the hemmed flange 70.

Figure 8:
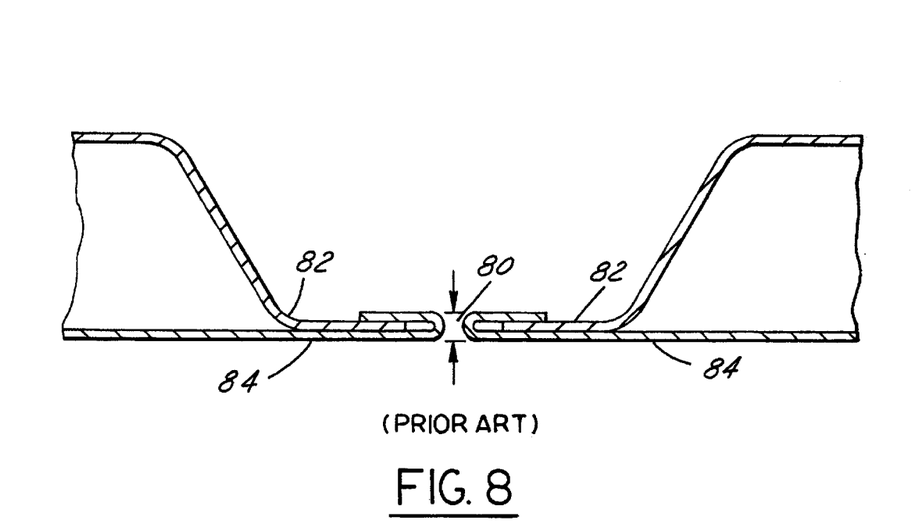
FIG. 8 is a fragmentary sectional view similar to that of FIG. 3 but illustrating a known hemmed flange configuration.

In either hemmed flange embodiment 25,70, the outer bend diameter 27,27' at the outer edge of the flange 25, 70 is substantially less than in the prior art, as shown in FIG. 8, wherein the outer bend diameter 80 of an outer panel 82 is equal to the sum of the thickness of the inner panel 82 and twice the thickness of the outer panel 84. If the panels 82 and 84 are of equal thickness the radius of the bend 80 is equal to three times the thickness of either panel. Desirably, the outer bend diameter 27 may be generally equal to one or two times the thickness of the outer sheet metal panel 22 or less. The reduced bend diameter 27,27' of the present invention provides an improved appearance of the finished hemmed panels by themselves, and in assembly relative to the prior art hemmed panels they appear to have a substantially more uniform and smaller gap and a flush alignment.

As with the first method and apparatus embodiment of FIGS. 1–6, the second embodiment shown in FIGS. 9 and 10 and the third embodiment shown in FIG. 11 are for forming a flat hem 24a, 24b in an outer sheet metal panel 22a, 22b onto an inner sheet metal panel 20a, 20b to connect the panels 20a, 20b; 22a, 22b together.

According to the second embodiment shown in FIGS. 9 and 10, the apparatus includes a support fixture in the form of a die ring 42a. The die ring 42a is shaped to greceive and hold a sheet metal panel, such as the outer sheet metal panel shown at 22a, having an upstanding border flange 25a formed along at least a portion of the panel 22a. The border flange 25a of the outer sheet metal panel 22a is bendable to the flanged position shown in FIG. 9. The inner sheet metal panel 20a is stacked on top of the outer sheet metal panel 22a in a layered disposition.

A roll hemming tool 60 is movably supported adjacent the fixture 42a and includes a forming roller 68 that engages and bends the border flange 25a while rolling along a length of the border flange 25a. The forming roller 68 is supported by a bearing 70 that is, in turn, supported on a forming roller axle 72. The forming roller 68 includes an outer circumferential forming face 62 that actually engages the border flange 25a. The forming face 62 includes a frusto-conical first portion 64 shaped to bend the upstanding border flange 25a of the outer sheet metal panel 22a along a first fold line 26a of the border flange 25a into a position forming an acute angle relative to an underlying portion of the inner sheet metal panel 20a as shown in FIG. 9. The forming face 62 of the hemming tool 60 forming roller 68 also has a cylindrical second portion 66 shaped and positioned to bend an outer portion 30a of the border flange 25a into a position over and generally parallel to the underlying portion of the inner sheet metal panel 20a. The second portion 66 of the forming face 62 bends the outer portion 30a of the border flange 25a along a second fold line 56a that is generally parallel to and spaced from the main fold line 26a.

The apparatus may also include a pre-hem tool such as the pre-hem tool 44 shown in FIG. 5, that pre-bends the border flange 25a to an acute included angle relative to the underlying portion of the panel before the forming roller 68 is used to form the final hem. When such a pre-hem tool 44 is used, it bends the border flange 25a to a pre-hem angle of between 25 and 75 degrees relative to the underlying portion of the panel.

Whether or not a pre-hem tool is to be employed, the forming roller 68 is shaped such that the frusto-conical first portion 64 of the forming surface 62 is shaped to incline relative to the cylindrical second portion 66 of the forming surface 62 at an obtuse included angle of between 110 and 160 degrees depending on, among other considerations, the thickness of the outer sheet metal panel.

In fabricating the roller 68, the angle of the frusto-conical first portion 64 of the forming surface 62 is selected to provide a border flange angle that meets requirements specified for an intended application. Depending on the selected angle of the frusto-conical first portion 64 of the forming surface 62, a border flange 25a that is hemmed by the hemming tool 60 may end up having an outer bend diameter 26a that's less than three times the thickness of the outer sheet metal panel 22a, less than twice the thickness of the outer sheet metal panel 22a, or that's approximately equal to the thickness of the outer sheet metal panel 22a.

The forming roller 68 is supported in a position to hem the border flange 25a over a peripheral edge 40a of the inner sheet metal panel 20a as shown in FIG. 9. When the forming roller 68 engages the border flange 25a, the frusto-conical first portion 64 of the forming surface 62 of the forming roller 68 is disposed outboard of the peripheral edge 40a of the inner panel 20a such that the cylindrical second portion 66 of the forming surface 62 of the forming roller 68 overlies the peripheral edge 40a of the inner sheet metal panel 20a.

To support the forming roller 68 for rotational and translational motion relative to the inner and outer sheet metal panels 20a, 22a, the apparatus includes a forming roller support arm 76. The forming roller support arm 76 may extend from any suitable manipulating means known in the art to include a robot arm or a roll form hemming machine. The support arm 76 and manipulating means support the roller axle 72 in such a way as to allow the roller 68 to be moved along a path that will cause the roller 68 to engage and hem the outer panel border flange 25a as described above and shown in FIGS. 9 and 10.

An inner end of the forming roller 68 includes a radially-extending annular rim 78 configured to guide the forming roller 68 along a periphery 79 of the fixture 42a. The radially-extending annular rim 78 is axially biased against the fixture 42a by a spring 86 disposed axially around the forming roller axle 72. The spring 86 is disposed between the forming roller 68 and a spring retainer portion 88 of the forming roller support arm 76. The spring 86 may be a coil spring, a gas spring or any other suitable biasing device known in the art.

According to the third flange hemming apparatus embodiment shown in FIG. 11, a ball roller 90 is supported on a collar 92 that is fixed to a forming roller axle 72b immediately adjacent a forming roller 68b. The ball roller 90 serves the same purpose as the radially extending annular rim 78 of the roller 68 in the second flange hemming apparatus embodiment of FIGS. 9 and 10 in that the ball roller 90 is disposed in a position to guide the forming roller 68b along a periphery 79b of a die ring fixture 42b. However, the ball roller 90 of the third embodiment accomplishes this by rolling along an outer side wall 94 of the die ring fixture 42b rather than turning against the side wall 94.

In practice, the second and third apparatus embodiments may be used to hem two sheet metal panels together by first providing an outer sheet metal panel 22a, 22b having a generally upstanding border flange 24a, 24b along a periphery 26a, 26b of the outer panel 22a, 22b. An inner sheet metal reinforcing panel 20a, 20b, that is slightly smaller than the outer panel 22a, 22b, is then positioned against the outer sheet metal panel 22a, 22b. The inner panel 20a, 20b is positioned against an inner surface of the outer panel 22a, 22b such that a peripheral edge 40a, 40b of the inner panel 20a, 20b is disposed adjacent and generally parallel to the border flange 24a, 24b of the outer panel 22a, 22b.

The forming roller 68, 68b is fabricated so that the frusto-conical first portion 64, 64b of its forming surface 62, 62b is angled to accommodate the thickness of the inner panel 20a, 20b and to provide a desired outer panel border flange fold radius. The forming roller 68, 68b is then mounted on a support arm 76, 76b of a robot or a roll hemming machine that is then programmed or otherwise configured to roll the forming roller 68, 68b along the hem. As the forming roller 68, 68b rolls along the border hem, the frusto-conical first portion 64, 64b of the forming surface 62, 62b of the roller 68, 68b folds the border flange 24a, 24b into its inclined position over the underlying portion of the outer panel 22a, 22b while the cylindrical second portion 66, 66b of the forming surface 62, 62b simultaneously folds the outer portion 30a, 30b of the border flange 24a, 24b into a position flat against the inner surface of the inner panel 22a, 22b. This is done by rolling the forming roller 68, 68b along the border flange 24a, 24b such that the frusto-conical first portion 64, 64b of the forming surface 62, 62b rolls along an inner portion 98, 98b of the border flange 24a, 24b and the cylindrical second portion 66, 66b of the forming surface 62, 62b rolls along the outer portion 30a, 30b of the border flange 24a, 24b. In its inclined position the border flange 24a, 24b forms an acute angle relative to the underlying portion of the panel.

Alternatively, a pre-hem roller or steel 44 may be used to fold the border flange 24a, 24b until the border flange is inclined against the peripheral edge 40a, 40b of the inner panel 20a, 20b such that a distal edge of the panel is spaced from the inner surface of the inner panel 20a, 20b as shown in phantom in FIG. 5. One of the two forming roller embodiments is then employed to further fold the border flange 24a, 24b such that the portion of the border flange 24a, 24b disposed generally parallel to the underlying portion of the outer panel 22a, 22b lies flat against the inner surface of the inner panel 20a, 20b, securing the inner panel to the outer panel.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. A sheet metal hemming apparatus for securing two sheet metal panels together by forming a generally flat hem along respective perpheries of the two panels, the apparatus comprising:
    a fixture configured to receive and hold a sheet metal panel having an upstanding border flange; and
    a hemming tool movably supported adjcent the fixture and having first and second forming portions configured to bend the upstanding border flange of a sheet metal panel supported on the fixture to form:
        a flat inner portion of the border flange inclined at an acute included angle relative to an underlying portion of the panel by the first forming portion; and
        a flat outer portion of the border flange forming an obtuse included angle relative to the inclined inner onion and disposed over and generally parallel to the underlying portion of the sheet metal panel by the second forming portion.

2. A sheet metal hemming apparatus as defined in claim 1 in which the hemming tool includes a roller configured to engage and bend the border flange while rolling along a length of the flange.

3. A sheet metal hemming apparatus for securing two sheet metal panels together by for a generally flat hem along respective peripheries of the two panels, the apparatus comprising:
    a fixture configured to receive and hold an outer sheet metal panel having an upstanding border flange; and
    a hemming tool movably supported adjacent the fixture and configured to bend the upstanding border flange of an outer sheet metal panel supported on the fixture to form:
        a flat inner portion of the border flange inclined at an acute included angle relative to an underlying portion of the outer panel; and
        a flat outer portion of the border flange forming an obtuse included angle relative to the inclined inner portion and disposed over and generally parallel to the underlying portion of the outer sheet metal panel;
    the hemming tool including a roller configured to engage and bend the border flange while rolling along a length of the flange, the roller including a generally frusto-conical forming surface configured and positioned to form the flat inclined inner portion of the border flange forming an acute angle relative to the underlying portion of the outer panel.

4. A sheet metal hemming apparatus as defined in claim 3 in which the roller includes a generally cylindrical forming surface configured and positioned to form the outer portion of the border flange at an obtuse angle to the inner portion of the flange and disposed over and generally parallel to the underlying portion of the sheet metal panel.

5. A sheet metal hemming apparatus as defined in claim 4 in which the frusto-conical forming surface is inclined relative to the cylindrical forming surface at an obtuse included angle of between 110 and 160 degrees.

6. A sheet metal hemming apparatus as defined in claim 5 in which the frusto-conical forming surface is inclined relative to the cylindrical forming surface at an angle of about 125 to 145 degrees.

7. A sheet metal hewing apparatus as defined in claim 3 in which:
    the fixture is constructed to receive an inner sheet metal panel stacked on the outer sheet metal panel;
    the roller is configured to hem the border flange over a peripheral edge of the inner panel; and
    the frusto-conical forming surface of the roller is disposed outboard of the peripheral edge of the inner panel when the roller is engaged with the border flange such that a cylindrical forming sure of the roller overlies the inner panel.

8. A sheet metal hoeing apparatus for securing two sheet metal panels together by forming a generally flat hem along respective peripheries of the two panels, the apparatus comprising:
    a fixture configured to receive and hold a sheet metal panel having an upstanding border flange; and
    at least one hemming tool movably supported adjacent the fixture and configured to bend the upstanding border flange of a sheet metal panel supported on the fixture along a first bend line into a position forming an acute included angle relative to an underlying portion of the panel, the hemming tool configured to bend an outer portion of the border flange along a second bend line into a position over and generally parallel to the underlying portion of the sheet metal panel, the hemming tool configured to form an outer bend diameter of the first bend line that is less a three times the thickness of the sheet metal panel while preventing the underlying portion of the sheet metal panel from bending adjacent the first bend line.

9. A sheet metal hemming apparatus as defined in claim 8 in which the hemming tool is configured to fold the border flange along a fold line such that the fold line has an outer bend diameter that's less than twice the thickness of the sheet metal panel.

10. A sheet metal hemming apparatus as defined in claim 8 in which the hemming tool is configured to fold the border flange along a fold line such that the fold line has an outer bend diameter that's generally equal to the thickness of the sheet metal panel.

11. A sheet metal hemming apparatus as defined in claim 8 in which:

the hemming tool includes a roller configured to engage and bend the border flange while rolling along a length of the flange; and the apparatus includes a robot arm configured to support the roller for rotational and translational motion relative to the panels.

12. A sheet metal hemming apparatus as defined in claim 8 in which:

the hemming tool includes a roller configured to engage and bend the border flange while rolling along a length of the flange; and the apparatus includes a roll form hemming machine configured to support the roller for rotational and translational motion relative to the panels.

13. A sheet metal hemming apparatus as defined in claim 8 in which the apparatus includes a pre-hem tool configured to bend the border flange to an acute included angle relative to the sheet metal panel.

14. A sheet metal hemming apparatus as defined in claim 13 in which the pre-hem tool bends the border flange to an angle between 25 and 75 degrees relative to the sheet metal panel.

15. A sheet metal hemming apparatus as defined in claim 8 in which:

the hemming tool includes a roller configured to engage and bend the border flange while rolling along a length of the flange; and the hemming tool is configured to bend the upstanding border flange of a sheet metal panel supported on the fixture to form a flat inclined inner portion of the border flange forming an acute angle relative to the underlying portion of the panel at the first bend line such that the outer portion of the border flange forms an obtuse angle relative to the inclined inner portion.

16. A sheet metal hemming apparatus as defined in claim 15 in which the roller includes a generally frusto-conical forming surface configured and positioned to form the flat inclined inner portion of the border flange at an acute angle to the underlying portion of the sheet metal panel.

17. A sheet metal hemming apparatus as defined in claim 15 in which the roller includes a generally cylindrical forming surface configured and positioned to form the outer portion of the border flange at an obtuse angle to the inner portion of the flange and disposed over and generally parallel to the underlying portion of the sheet metal panel.

18. A sheet met hemming apparatus for securing two sheet metal panels together by forming a generally flat hem along respective peripheries of the two panels, the apparatus comprising:

a fixture configured to receive and hold a sheet metal panel having an upstanding border flange; and at least one hemming tool movably supported adjacent the fixture and configured to bend the upstanding border flange of a sheet metal panel supported on the fixture to form:

a flat inner portion of the border flange inclined at an acute included angle relative to an underlying portion of the panel; and a flat outer portion of the border flange forming an obtuse included angle relative to the inclined inner portion and disposed over and generally parallel to the underlying portion of the sheet metal panel;

the hemming tool including a roller configured to engage and bend the border flange while rolling along a length of the flange, an inner end of the roller including a radially-extending annular rim configured to guide the roller along a periphery of the fixture and to hold the roller at a fixed axial distance relative to the periphery of the fixture.

19. A sheet metal hemming apparatus as defined in claim 18 in which the radially-extending roller annular rim is axially biased against the fixture.

20. A sheet metal hemming apparatus for securing two sheet metal panels together by forming a generally flat hem along respective peripheries of the two panels, the apparatus comprising:

a fixture configured to receive and hold a sheet metal panel having an upstanding border flange;

a hemming tool movably supported adjacent the fixture and configured to bend the upstanding border flange of a sheet metal panel supported on the fixture into a position forming an acute included angle relative to an underlying portion of the panel, the hemming tool configured to bend an outer portion of the border flange into a position over and generally parallel to the underlying portion of the sheet metal panel, the hemming tool including:

a roller configured to engage and bend the border flange while rolling along a length of the flange, the roller being supported on a roller axle; and a ball roller supported on the roller axle in a position to guide the roller along a periphery of the fixture by rolling along an outer wall of the fixture.

21. A method for securing two sheet metal panels together by forming a generally flat hem along respective peripheries of the two panels, the method including the steps of:

providing an outer sheet metal panel having a generally upstanding border flange along a periphery of the outer panel;

folding the border flange along a first bend line to form a flat inclined inner portion of the border flange overlying and forming an acute included angle relative to an underlying portion of the outer panel;

folding the bolder flange along a second bend line such that:

a flat outer portion of the flange forms an obtuse included angle relative to the inclined inner portion and is disposed generally parallel to an underlying portion of The outer panel; and the underlying portion of the outer panel is precluded from bending adjacent the fist bend line.

22. The method of claim 21 in which:

the following additional steps are included before the step of folding the border flange along a first bend line:

providing an inner sheet metal reinforcing panel that is slightly smaller than the outer sheet metal panel; and placing the inner panel against an inner surface of the outer panel such that a peripheral edge of the inner panel is disposed adjacent and generally parallel to the border flange of the outer panel;

and in which:

the step of folding the border flange includes folding the border flange until the flange is inclined against the peripheral edge of the inner panel such that a distal edge of the panel is spaced from the inner surface of the inner panel; and the step of further folding the border flange includes folding the border flange such that the portion of the flange disposed generally parallel to the underlying portion of the outer panel lies flat against the inner surface of the inner panel, securing the inner panel to the outer panel.

23. The method of claim 21 in which the step of folding the border flange along a first bend line includes:

providing a roller including a generally frusto-conical forming surface; and bending the inner portion of the border flange into a position forming an acute angle relative to the underlying portion of the panel by rolling the frusto-conical forming surface along the inner portion of the flange.

24. The method of claim 21 in which the step of folding the border flange along a first bend line includes providing a roller having a generally frusto-conical forming surface angled to accommodate a given inner panel thickness and to provide a desired outer panel flange fold radius.

25. The method of claim 21 in which the step of folding the border flange along a second bend line includes:

providing a roller including a generally cylindrical forming surface; and bending the outer portion of the border flange into position over and generally parallel to the underlying portion of the sheet metal panel by rolling the cylindrical forming surface along the outer portion of the flange.

\* \* \* \* \*

UNITED STATES PATENT AND TRADEMARK OFFICE
CERTIFICATE OF CORRECTION

PATENT NO.    : 6,425,277 B2
DATED         : July 30, 2002
INVENTOR(S)   : Philip V. Wiens It is certified that error appears in the above-identified patent and that said Letters Patent is hereby corrected as shown below:

Column 7,
Line 46, delete "onion" and insert -- portion --.
Line 54, delete "for" and insert -- forming --.

Column 8,
Line 17, delete "claim 4" and insert -- claim 3 --.
Line 1, delete "hoeing" and insert -- hemming --.

Column 10,
Line 47, delete "The" and insert -- the --.

Signed and Sealed this

Seventh Day of January, 2003

JAMES E. ROGAN
*Director of the United States Patent and Trademark Office*